R. LLEWELLYN.
Feed-Water Heater and Condenser for Steam-Boilers.
No. 218,446.  Patented Aug. 12, 1879.
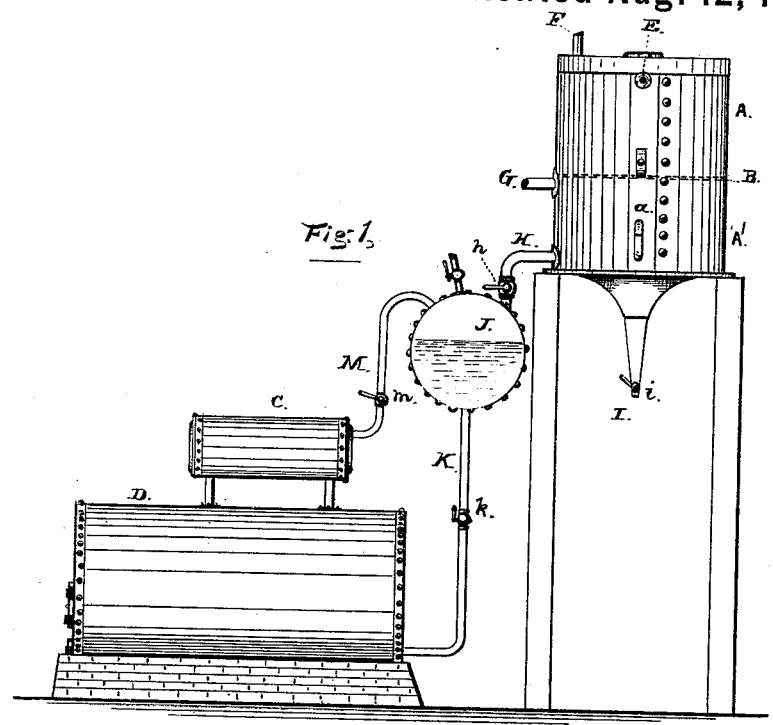
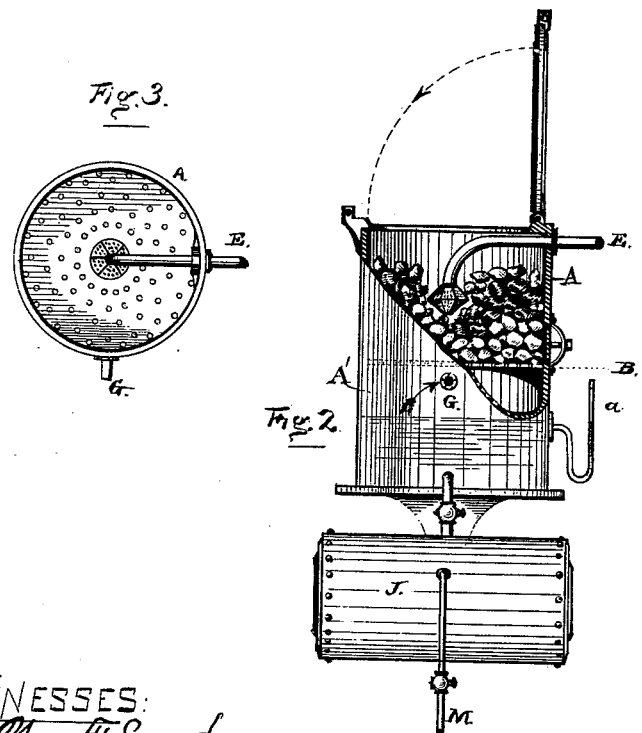
WITNESSES:
Wm. F. Smith
Edward O. Osborn
INVENTOR:
Reese Llewellyn
By C. W. M. Smith his Atty

UNITED STATES PATENT OFFICE.

REESE LLEWELLYN, OF SAN FRANCISCO, CALIFORNIA.

IMPROVEMENT IN FEED-WATER HEATERS AND CONDENSERS FOR STEAM-BOILERS.

Specification forming part of Letters Patent No. 218,446, dated August 12, 1879; application filed December 30, 1878.

*To all whom it may concern:*

Be it known that I, REESE LLEWELLYN, of the city and county of San Francisco, in the State of California, have invented a certain new and useful invention or Improvement in Feed - Water Heaters and Condensers for Steam-Boilers; and I do hereby declare that the following is a full, clear, and exact description of the mode of constructing, applying, and operating the same, reference being had to the accompanying drawings, making part of this specification.

My invention has for its object to utilize the heat of the exhaust-steam in raising the temperature of the feed-water, and also at the same time to condense the steam and convert it into feed-water, thus causing the engine and boiler to be worked with greater economy in the consumption of coal and water. These two items of expense are of considerable importance in the use of engines on the Pacific coast.

To such end and purpose my invention consists in the novel construction of a feed-water heater composed of a condensing - chamber above and a hot-water chamber below, the two being divided by a perforated diaphragm. The upper chamber contains a condensing and filtering medium composed of a quantity of pebbles, cobble-stones, or other similar bodies of irregular shape and size, with a layer of coke, charcoal, or other filtering substance placed within it. Above this body is fixed a sprinkling device, and beneath it, below the perforated bottom, is situated an exhaust-steam-inlet pipe.

The hot-water chamber, below the perforated bottom, is to be connected with the feed-water pipe of the boiler, or with a hot-water reservoir. Thus, when the exhaust-steam is turned into the upper chamber it is obliged to pass up through the body of stones, pebbles, and similar substances, which are kept continually wet and reduced in temperature by means of the jets of cold water admitted from above through the sprinkler, and the resultant hot water is allowed to pass through the perforated bottom and collect in the chamber below.

Referring to the accompanying drawings, Figure 1 is a side elevation of my invention as applied to a stationary boiler of the horizontal kind. Fig. 2 is a front view of the apparatus with a portion of the shell of the chamber broken away. Fig. 3 is a plan view of the condensing and heating chambers.

A A' represent my condensing and heating chambers; B, the horizontal perforated bottom or diaphragm; C, the steam-chamber of a boiler, and D the boiler. This chamber A is fitted with a steam-tight cover, and has also an inlet-pipe, E, for admitting cold water, and an outlet steam-pipe, F, for the escape of any steam that may not be condensed after passing through the condensing medium.

The lower portion, A', for receiving the hot water, has a steam-inlet pipe, G, a hot-water-outlet pipe, H, and a discharge-pipe, I, at the bottom, for cleaning out the chamber whenever it becomes foul.

This apparatus is placed in any convenient position above the boiler, and the steam from the engine-cylinders is led into the condensing-chamber through the pipe G, just beneath the perforated bottom, while the hot water is drawn off through the pipe H and led into the boiler.

Within the chamber A is placed the condensing and filtering medium, which consists of a quantity of pebbles, cobble-stones, or other similar bodies of irregular shape and size, whether of stone or metal, which will provide a mass with interstices of different sizes throughout it. Interposed between this body of pebbles, &c., is a layer of charcoal, coke, or other proper filtering substance, to purify the water fed in through the sprinkler-pipe above. This mass within the chamber acts upon both the incoming steam from below to condense it, and upon the cold water sprinkled from above to heat it, and serves also by its filtering action to hold back any impurities from the water passing through it, and thus permit the boiler to be run much longer without fouling. This part of my invention is of great value in localities where the water contains or carries earthy or slimy particles and impurities.

In connection with this condenser and heater, I employ a means for supplying the feed-water to the boiler without the use of a pump, which consists of a drum or hot-water reservoir, J, placed between the condenser and the boiler, and connected with both by the water-pipes K H. From the steam-space of chamber C a steam-pipe, M, is led up to the top of the drum, to admit steam under pressure within the upper part of the drum upon the hot water. Thus, by shutting the cock $h$ in the water-pipe H, and then opening the steam and water cocks $k$ $m$ in the other pipes, K M, the pressure will force the hot water into the boiler, and the feeding is effected in this manner without pumping.

The condenser and heater A A' is to be provided with the necessary water-level tubes, gage-cocks, man-holes, &c., for the proper operation of the apparatus, and to facilitate cleaning and removing of the pebbles and other matter from the chamber above the diaphragm when they become incrusted with alkali; and the bottom of the lower chamber has a discharge-pipe, I, to permit the withdrawal of any deposit.

In the operation of my invention as thus constructed the exhaust-steam admitted through the pipe beneath the perforated diaphragm passes up through the mass of stones and filtering matter, over which a spray or jets of cold water distributed from the sprinkler will act to keep them constantly wet. The ascending steam and the descending water are in this manner brought in intimate contact, and while one is being condensed the other becomes heated, the product being hot water at a high temperature. This water then passes through the perforated bottom into the chamber below, where it receives also the heat from the incoming steam. The layer of filtering matter acts to cleanse and purify the water and retain in the upper chamber all the impurities.

The stones and filtering material can be removed and renewed from time to time, as required.

The water thus supplied to the boiler is almost at the boiling-point, and for this reason there is no material reduction in the pressure of steam in the boiler, and its production is not arrested when the feed-water is turned in. A saving in fuel is thus effected. The perfect condensation also produced makes a great saving in the amount of water used, and in localities where the supply is scarce and the rate high this item is of importance.

The outlet-pipe at the top of the chamber A, that is provided for the discharge of whatever steam may escape condensation, can be connected with a second and similar condensing-chamber with condensing medium and spraying apparatus, if desired, to effect a perfect condensation of any steam from the first; but this would be merely a duplication of my improvement, and as such it would not depart from the nature and principle of my invention, as herein described.

Having thus fully described my invention, what I claim as new therein, and desire to secure by Letters Patent, is—

The combination in one vessel or apparatus of the condensing and filtering chamber A, having a perforated diaphragm, B, the water-spraying pipe E, the feed-water-receiving chamber J, having the exhaust-steam inlet H, located in the side thereof, and the boiler D and pipe K, arranged as shown, and for the purpose described.

In testimony that I claim the foregoing I have hereunto set my hand and seal this 11th day of October, 1878.

REESE LLEWELLYN. [L. S.]

Witnesses:
 C. W. M. SMITH,
 JOHN RAFFERTY.